(12) United States Patent
Jani

(10) Patent No.: US 8,844,580 B2
(45) Date of Patent: Sep. 30, 2014

(54) LOW FLUID PERMEATION RUBBER HOSE

(75) Inventor: Bhargav V. Jani, Corona, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1128 days.

(21) Appl. No.: 12/751,139

(22) Filed: Mar. 31, 2010

(65) Prior Publication Data

US 2010/0243097 A1 Sep. 30, 2010

Related U.S. Application Data

(60) Provisional application No. 61/164,981, filed on Mar. 31, 2009.

(51) Int. Cl.
| | |
|---|---|
| *F16L 11/00* | (2006.01) |
| *B29C 63/10* | (2006.01) |
| *F16L 11/08* | (2006.01) |
| *B29C 53/60* | (2006.01) |
| *B29K 27/12* | (2006.01) |
| *F16L 11/04* | (2006.01) |

(52) U.S. Cl.
CPC ............ *B29C 63/10* (2013.01); *B29K 2027/12* (2013.01); *F16L 2011/047* (2013.01); *F16L 11/081* (2013.01); *B29C 53/60* (2013.01)
USPC ........... 138/129; 138/137; 138/140; 138/144; 428/36.3

(58) Field of Classification Search
USPC ......... 138/129, 130, 137, 140, 125, 144, 150; 428/36.3, 36.91
See application file for complete search history.

(56) References Cited

U.S. PATENT DOCUMENTS

| | | | |
|---|---|---|---|
| 2,888,042 A | 5/1959 | St. John et al. | |
| 2,962,050 A | 11/1960 | Ramberg et al. | |
| 3,093,162 A | 6/1963 | Reiling | |
| 3,302,479 A | 2/1967 | Conrad | |
| 3,355,572 A | 11/1967 | Chrow | |
| 3,369,426 A | 2/1968 | Matz, Jr. | |
| 3,394,953 A | 7/1968 | Landon | |
| 3,400,737 A | 9/1968 | Matthews et al. | |
| 3,817,288 A * | 6/1974 | Ball | 138/125 |
| 4,402,346 A | 9/1983 | Cheetham et al. | |
| 4,462,556 A * | 7/1984 | Graham, Jr. | 242/118.31 |
| 4,673,002 A | 6/1987 | Scanlon et al. | |
| 4,950,436 A | 8/1990 | Kitami et al. | |
| 4,982,765 A | 1/1991 | Usui | |
| 5,398,729 A * | 3/1995 | Spurgat | 138/133 |
| 5,518,035 A * | 5/1996 | Hoshishima et al. | 138/109 |
| 5,622,210 A | 4/1997 | Crisman et al. | |

(Continued)

FOREIGN PATENT DOCUMENTS

| | | |
|---|---|---|
| WO | 03086756 A1 | 10/2003 |
| WO | 2005101462 A2 | 10/2005 |

OTHER PUBLICATIONS

Titan Industries, BioPlus™ Petrolelum Suction Hose data sheet.

*Primary Examiner* — Patrick F Brinson
(74) *Attorney, Agent, or Firm* — John A. Molnar, Jr.

(57) ABSTRACT

Low or near zero fluid permeation hose for petroleum and other chemical transfer applications. The hose includes an inner tube formed of a vulcanized rubber, and a barrier layer of a strip of a fluoropolymer of other polymeric material resistant to fluid permeation. The strip is spiral wound about the longitudinal axis of the hose.

11 Claims, 2 Drawing Sheets

(56) References Cited

U.S. PATENT DOCUMENTS

| | | | |
|---|---|---|---|
| 5,957,164 A * | 9/1999 | Campbell | 138/137 |
| 6,439,268 B2 * | 8/2002 | Niki et al. | 138/126 |
| 6,705,351 B2 * | 3/2004 | Fraser | 138/129 |
| 6,889,715 B2 * | 5/2005 | Fraser et al. | 138/129 |
| 6,941,975 B2 * | 9/2005 | Wilson et al. | 138/141 |
| 6,945,279 B2 | 9/2005 | Baba et al. | |
| 7,913,719 B2 * | 3/2011 | Werner et al. | 138/127 |
| 2002/0100516 A1 * | 8/2002 | Powell et al. | 138/125 |
| 2004/0040609 A1 | 3/2004 | Oishi et al. | |
| 2004/0099324 A1 * | 5/2004 | Fraser et al. | 138/129 |
| 2010/0300571 A1 * | 12/2010 | Miller et al. | 138/137 |

* cited by examiner

LOW FLUID PERMEATION RUBBER HOSE

CROSS REFERENCE TO RELATED APPLICATIONS

The present application claims the benefit of the filing date of U.S. Provisional Application Ser. No. 61/164,981, filed Mar. 31, 2009, the disclosure of which is incorporated herein by reference in its entirety.

BACKGROUND OF THE INVENTION

The present invention relates broadly to flexible rubber hoses, and more particularly to a construction therefor for use in petroleum and other chemical transfer applications.

Flexible rubber hose is used in a variety of petroleum and other chemical transfer applications. In basic construction, hoses of the type herein involved typically are formed as having a tubular, innermost inner tube or core surrounded by one or more outer layers of a braided or spiral-wound reinforcement material which may be a metal or metal-alloy wire or a natural or synthetic fiber. The reinforcement layers, in turn, are protected by a surrounding outermost jacket or cover which may be of the same or different material as the inner tube. The cover also provides the hose with increased abrasion resistance.

In the case of rubber hose constructions, the inner tube may be provided as formed of a vulcanizable natural or, more typically, a synthetic rubber material such as Buna-N or neoprene. Such material or blend may be conventionally extruded and cooled or cured to form the inner tube. As is detailed in U.S. Pat. Nos. 3,116,760; 3,159,183; 3,966,238; and 4,952,262, if necessary, the tube may be cross-head extruded over a mandrel for support, or otherwise supported in later forming operations using air pressure and/or reduced processing temperatures.

From the extruder, the inner tube may be delivered through a braider and/or a spiral winder for its reinforcement with one or more surrounding layers of a wire and/or fibrous material or blend such as a monofilament, yarn, cord, yarn-wire composite, or roving. As is described in Japanese (Kokai) Publ. No. 10-169854 A2, Canadian Patent No. 973,074, and U.S. Pat. Nos. 3,654,967; 3,682,201; 3,790,419; 3,861,973; 3,905, 398; 4,007,070; 4,064,913; 4,343,333; and 4,898,212, these reinforcement layers are applied under tension and typically may be formed of an interwoven braid or a spiral winding of a nylon, polyester, polyphenylene bezobisoxazole, polyvinyl acetate, liquid crystal polymer (LCP), or para-, meta-, or other aramid yarn, or a high tensile steel or other metal wire. A bonding or other interlayer of a vulcanizable rubber may be extruded or otherwise applied between each of the reinforcement layers to bond each layer to the next layer.

Following the braiding, winding, or other application of the reinforcement layers and the interlayers, an outer cover or sheath optionally may be applied. Such cover, which may be formed as a cross-head extrusion, a moisture-cured or solvent-based dipped coating, or a spiral-wound wrapping, typically comprises an abrasion-resistant synthetic rubber or a thermoplastic such as a polyurethane. Following the application of the cover, the hose construction so-formed by be heated to vulcanize the rubber layers and thereby consolidate the construction into an integral hose structure. Representative hose constructions, as well as manufacturing methods and materials therefor, are shown in U.S. Pat. Nos. 3,921,674; 3,953,270; 3,994,761; 4,104,098; 4,238,260; 4,759,388; 6,037,025; 6,474,366 and 7,143,789.

In normal use, hoses of the type herein involved may be exposed to a variety of environmental factors and mechanical stresses which cannot always be predicted. Of utmost importance to the integrity and performance of the hose is that a strong bond is achieved between the constituent parts thereof. However, while it is important to bond these parts together, it is also important that the hose not be made overly stiff so as to make it prone to kinking or fatigue or otherwise useable for certain applications. Hose constructions, accordingly, must exhibit a demanding balance of chemical and physical properties.

As environmental concerns and industry awareness have resulted in increasingly more stringent emission standards, it is believed that improvements in hose constructions would be well-received by numerous industries concerned with the transfer of petroleum and other chemicals. Especially desired would be a construction which is flexible and light-weight, and which is exhibits low or near zero permeation to petroleum and other chemicals.

BROAD STATEMENT OF THE INVENTION

The present invention is directed to flexible rubber hoses, and particularly to a construction therefor which results in a hose which exhibits low or near zero fluid permeation to petroleum and other chemicals. Such construction may be adapted for use in a variety of fluid transfer applications.

The hose of the present invention is constructed as having a barrier layer formed strip of a polymeric material which is a spiral wound about the longitudinal axis of the hose. The polymeric material may be a fluoropolymer such as polytetraflurorethylene (PTFE) or fluorinated ethylene propylene (FEP), or a copolymer or blend thereof, which is generally impermeable to petroleum and petrochemicals, as well as a variety of other chemicals and fluids.

The barrier layer may be the innermost layer of the hose as spiral wound as a series of turns on the mandrel upon which the hose otherwise may be constructed. The layer may be so wound with the turns thereof being overlapped, spaced-apart or "underlapped," or "abutted" with the edge of each turn touching the edge of the next adjacent turn. If so underlapped or abutted, the edges of each turn and each next adjacent turn may be sealed by a covering of a narrower spiral wound strip of a rubber or an adhesive material such as a rubber or acrylic pressure sensitive adhesive (PSA). If so overlapped, the edges of each turn may be sealed by a backing or other underlying PSA strip or other layer. In either construction, the hose may include an rubber inner or core tube or core formed over the barrier layer, and reinforcement layers, filler or other interlayers layers, and additional barrier layers wound, extruded, or otherwise formed over the innermost barrier layer and the inner tube. In the case of an underlapped innermost barrier layer, the additional barrier layers may be used to provide, effectively, 100% coverage of the inner tuber.

In an illustrated embodiment, the hose construction of the present invention includes the aforementioned innermost barrier layer and inner tube over which, for example, one or more layers of textile and/or wire reinforcement layers are spiral wound, braided, or otherwise formed to provide resistance to internal working pressures of 50 psi or more. These layers and any additional barrier layers may be sheathed within an outermost additional barrier layer, or a conventional rubber or plastic layer, either of which may form an outer cover or jacket for the hose. Each of these individual layers may be bonded to an adjacent layer or otherwise consolidated with the other layers into an integral hose wall structure by the interposition therebetween of one or more wound, extruded, or otherwise formed rubber, thermoplastic, adhesive, or other fill or interlayers. In the case of the inner tube, fill layers, and cover being formed of a rubber, these layers my be vulcanized or otherwise cured to so bond each layer in the hose wall to the next adjacent layer to thereby consolidate the layers into such integral hose wall structure.

The present invention, accordingly, comprises the construction, combination of elements, and/or arrangement of parts and steps which are exemplified in the detailed disclosure to follow. Advantages of the present invention include a hose which is economical to manufacture, and which may be constructed in a variety of configurations as adapted for use in a variety of chemical transfer applications specifying low or near-zero permeation rates. Additional advantages include a low or near-zero permeation hose which retains a bend radius and other flexibility comparable to that of conventional rubber hose and increased over that of conventional fluoropolymer-lined hose. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
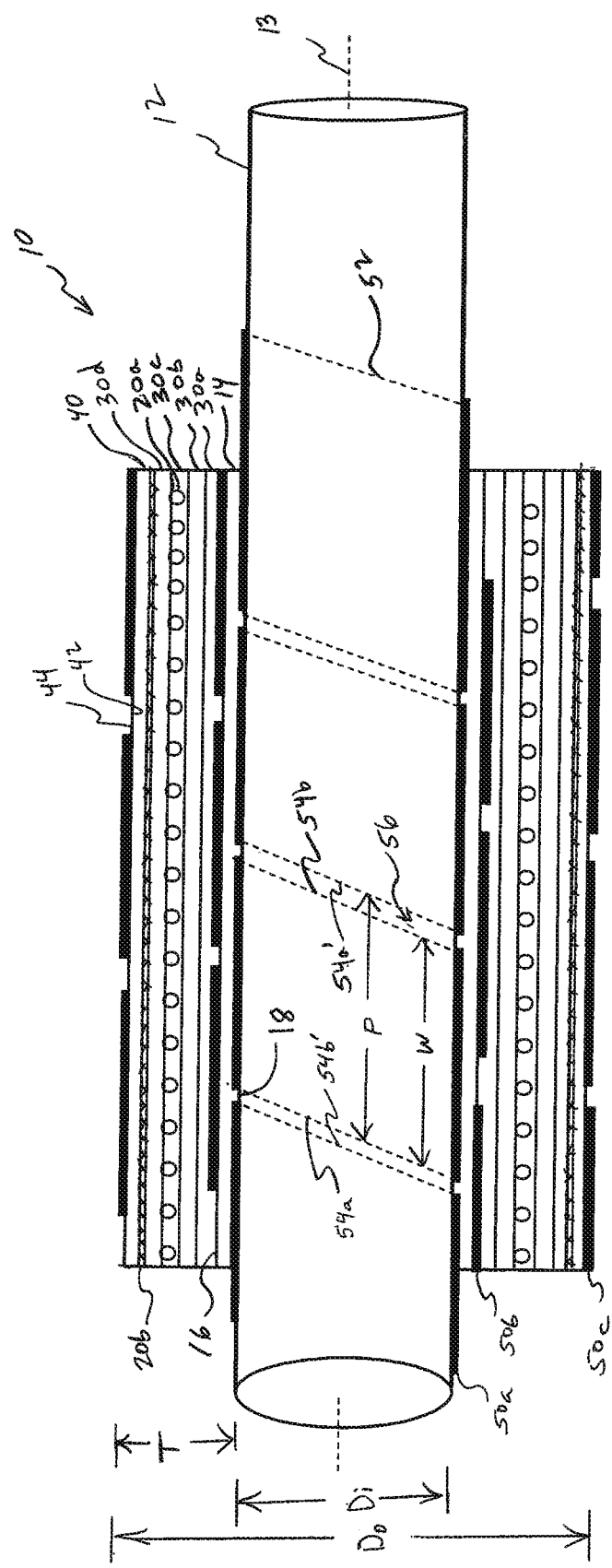
FIG. 1 is a side elevation view, partially in cross-section, of a representative low or near zero fluid permeation rubber hose according to the present invention, such hose being shown as being constructed on a mandrel and as including an innermost barrier layer formed of a strip of a generally fluid impermeable polymeric material.

The drawings will be described further in connection with the following detailed description of the invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For illustration purposes, the precepts of the low or near zero rubber hose construction herein involved are described in connection with its configuration as particularly adapted for use in petroleum transfer applications. It will be appreciated, however, that aspects of the present invention may find use in other hose constructions for a variety of chemical and other fluid transfer applications. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, a representative hose construction according to the present invention is shown generally at 10 in the cross-sectional of FIG. 1 as being formed on a mandrel, 12. In basic dimensions, hose 10 extends axially to an indefinite length along a central longitudinal axis, commonly referenced at 13 with the central longitudinal axis of mandrel 12, and has a select inner and outer diameter referenced, respectively, at "$D_i$" and "$D_o$," with the wall thickness, referenced at "T," being defined therebetween. The inner and outer diameter dimensions may vary depending upon the particular fluid transfer application involved.

As may be seen FIG. 1, hose 10 is constructed as formed on mandrel 12 as having an inner tube or core, 14, which may be of a single or multi-layer construction. In either construction, inner tube 14 has a circumferential outer core tube surface, 16, and a circumferential inner core tube surface, 18. A wall thickness is defined between the outer and inner core tube surfaces 16 and 18 which may be at least the minimum necessary to provide the desired pressure rating and solvent, gas, and/or liquid permeation resistance.

Inner tube 14 may be provided as wrapped, extruded or otherwise formed of a vulcanizable, preferably chemically-resistant, synthetic rubber material. As used herein, "chemical resistance" should be understood to mean the ability to resist swelling, crazing, stress cracking, corrosion, or otherwise to withstand attack from organic solvents and hydrocarbons, such as hydraulic fluids. Suitable materials include copolymer rubbers such as ethylene-propylene-diene monomer (EPDM) and nitriles such as acrylonitrile butadiene rubbers (NBR), modified NBR's such as hydrogenated NBR (HNBR) and cross-linked NBR (XNBR), as well as blends and combinations thereof. Such blends may be, for example, XNBR or HNBR blended with one or more of a chlorinated polyethylene (CPE), polyvinyl chloride (PVC), or polychloroprene (CR). The rubber material may be compounded with between about 15-66% by total weight of the compound of one or more reinforcing fillers. Each of such fillers may be provided, independently, as a powder or as flakes, fibers, or other particulate form, or as a mixture of such forms. Typical of such reinforcing fillers include carbon blacks, clays, and pulp fibers.

Additional fillers and additives may be included in the formulation of the rubber compound depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or antifoaming agents, anti-static agents, coupling agents such as titanates, chain extending oils, tackifiers, flow modifiers, pigments, lubricants, silanes, and other agents, stabilizers, emulsifiers, antioxidants, thickeners, and/or flame retardants. The formulation of the material may be compounded in a conventional mixing apparatus as an admixture of the rubber and filler components, and any additional fillers or additives.

In the illustrated reinforced construction, one or more reinforcement layers, one of which is referenced at 20a and another of which is referenced at 20b, may be provided as surrounding the inner tube 14. Each of the reinforcement layers 20 may be independently formed as braided, knitted, wrapped, or, as is shown, spiral, i.e., helically, wound of, for example, from 1 to about 180 ends of monofilament, continuous multi-filament, i.e., yarn, strand, cord, roving, thread, tape, or ply, or short "staple" strands of a fiber material. The fiber material, which may be the same or different in layers 20, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal or alloy wire, or a blend thereof. For illustrative purposes, reinforcement layer 20a is represented to be a helically wound wire, with layer 20b being represented as a woven fabric or other textile.

Although the innermost of the reinforcement layers 20 may be laid directly over the outer surface 16 of inner tube 14, one or more filler or other intermediate rubber, plastic, textile, adhesive, foil, or film or other layers, 30a-c, may be extruded, wound, braided, knitted, or otherwise laid between reinforcement layer 20a and inner tube 14. As shown at 30d, such other filler or other intermediate layers 30 also may be laid over the reinforcement layers 20a-b and/or between the layers 20a-b in the case of multiple reinforcement layers. To better control the elongation and contraction of hose 10, and for improved impulse fatigue life and otherwise for the more efficient transfer of induced internal or external stresses, the reinforcement layers 20 may be bonded, such as by means of fusion, i.e., vulcanization, of the inner tube 14 and/or the fill layers 30, or otherwise by mechanical, chemical, or adhesive bonding, or a combination thereof or otherwise, to the adjacent layers in the construction of hose 10. For example, each of the interlayers 30 immediately preceding one of the reinforcement layers 20 may be laid in the form of a melt-processible or vulcanizable material which is extruded, wrapped, or otherwise applied in a molten, softened, uncured or partially uncured, or otherwise viscous or semi-viscous phase. The reinforcement layer 20 then may be wound or otherwise laid over such interlayer 30 while it is still in its softened phase. Alternatively in the case of a thermoplastic interlayer 30, the layer may be reheated to effect its re-softening prior to the laying of the reinforcement layer 30.

The materials for forming such of the interlayers 30 specifically may be selected for high or low temperature performance, flexibility, resistance to fluid permeation, or otherwise for compatibility with the other layers of the hose 10. Suitable materials include natural and synthetic rubbers, as well as thermoplastic, i.e., melt-processible, or thermosetting, i.e., vulcanizable, resins which should be understood to also include, broadly, materials which may be classified as elastomers or hot-melts. Representative of such resins include plasticized or unplasticized polyamides such as nylon 6, 66, 11 and 12, polyesters, copolyesters, ethylene vinyl acetates, ethylene terpolymers, polybutylene or polyethylene terephthalates, polyvinyl chlorides, polyolefins, fluoropolymers, thermoplastic elastomers, engineering thermoplastic vulcanizates, thermoplastic hot-melts, copolymer rubbers, blends such as ethylene or propylene-EPDM, EPR, or NBR, polyurethanes, and silicones. In the case of thermoplastic resins, such resins typically will exhibit softening or melting points, i.e., Vicat temperatures, of between about 77-250° C. For amorphous or other thermoplastic resins not having a clearly defined melting peak, the term melting point also is used interchangeably with glass transition point.

One or more of the interlayers 30 also may be provided as a conventional barrier layer such as a tube formed of a permeation resistant nylon or other plastic, or as a spiral or other wrapping of a metal foil.

The inner tube 14, reinforcement layers 20, and any fill or other interlayers 30 may be sheathed within one or more layers of a coaxially-surrounding protective cover or jacket, referenced at 40, having a circumferential interior surface, 42, and an opposing circumferential exterior surface, 44. Depending upon its construction, cover 40 may be spray-applied, dip coated, cross-head or co-extruded, or otherwise conventionally extruded, spiral or longitudinally, i.e., "cigarette," wrapped, or braided over the outermost fill layer 30d as, for example, a 0.02-0.15 inch (0.5-3.8 mm) thick layer of an fiber, glass, ceramic, or metal-filled, or unfilled, abrasion-resistant thermoplastic, i.e., melt-processible, or thermosetting, vulcanizable natural rubber or a synthetic rubber such as fluoropolymer, chlorosulfonate, polybutadiene, butyl, neoprene, nitrile, polyisoprene, buna-N, and, particularly, chloroprene rubber (CR), copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR, and copolymers and blends of any of the foregoing. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation. By "abrasion-resistant," it is meant that such material for forming cover 40 may have a hardness of at least about 60 Shore A durometer.

Any of the materials forming the cover 40 may be loaded with metal particles, carbon black, or another electrically-conductive particulate, flake, or fiber filler so as to render hose 10 electrically-conductive for static dissipation or other applications. Separate electrically-conductive fiber or resin layers (not shown), which may be in the form of spiral or "cigarette-wrapped" tapes or otherwise provided, also may be included in the hose construction 10.

To afford hose with the required degree of permeation resistance to such fluids as petroleum and other chemicals, one or more barrier layers of a generally fluid impermeable thermoplastic or other polymeric material are incorporated into the construction of hose 10 as shown, for example, as layers 50a-c. Each of the barrier layers 50 may be spiral, i.e., helically, wound about the 13 axis as a strip of a tape or other film form having a thickness of, for example, between about 1-10 mil.

The polymeric material forming the layers 50, which may be the same or different in each layer, which may or may not be melt-processible. Although such material may be a polyolefin, polyester, polyvinyl chloride, ethylene vinyl alcohol (EVA), silicone, thermoplastic rubber, polyurethane, polyamide, nylon or other plastic or elastomer, for most petroleum and other chemical transfer applications requiring low liquid, gas, or other fluid permeation and chemical resistance, the material will be a fluoropolymer. Such fluoropolymers include, particularly, polytetrafluoroethylene (PTFE) and fluorinated ethylene polypropylene (FEP) copolymer, as well as other fluoropolymers such as fluoroalkoxy (PFA) resin, polychlorotrifluoroethylene (PCTFE) copolymer, ethylene-chlorotrifluoroethylene (ECTFE) copolymer, ethylene-tetrafluroethylene (ETFE) terpolymer, polyvinylidene fluoride (PVDF), polyvinylfluoride (PVF), and copolymers, blends, and combinations thereof. As further depending upon the requirements of the particular application, these materials may include one or more fillers or additives.

With continuing reference to FIG. 1, barrier layer 50a may be provided as the innermost layer of the hose 10 as spiral wound in a series of turns directly on mandrel 12 from a strip, partially shown in phantom at 52, of the impermeable polymeric material. Such strip 52 has a pair of edges, referenced in phantom at 54a-b, which define the width, referenced at "w," of the strip 52. As shown, the strip 52 may be wound at a pitch, referenced at "p," which is greater than the width w such that the winding of the strip 52 is "underlapped" with the edges 54a and 54b of each turn being spaced-apart from, respectively, each adjacent edge 54b' and 54a' so as to form a series of gaps, one of which is reference at 56, between each of the turns.

With the inner tube 14 being laid over the barrier layer 50a, the turns thereof may be spaced such that, for example, between 1-5% for a narrower spacing of the turns, or up to 50% or more for a wider spacing of the turns, of the tube inner surface 18 remains exposed to the fluid being conveyed through the hose. In the case of either of these spacing, it has been observed that such coverage may provide sufficiently low permeation for certain fluid transfer applications.

For still further increased permeation resistance, such as to meet more stringent emission requirements, additional barrier layers such as the layers 50b and 50c may be wound over one of the other layers in hose 10 as an additional inner layer, such as in the case of layer 50b, or as the outermost layer of the hose, such as in the case of layer 50c. Such additional barrier layers 50b-c may be used to cover the gaps 56 in the innermost barrier layer 50a and/or any preceding barrier layers 50, as well as to function as a full or partial outer covering for the hose 10.

As shown in FIG. 1, each of the barrier layers 50 may be wound as underlapped with gaps 56 provided between each turn. To increase the coverage of the inner tube 14 and/or the cover 40, and otherwise for greater permeation resistance, any of the layers 50 may be wound such that each edge 54a and 50b of each turn abuts the next adjacent edge 54b' and 54a', i.e., the width w of the strip 52 and the pitch p of the turns being about equal.

Figure 2A:
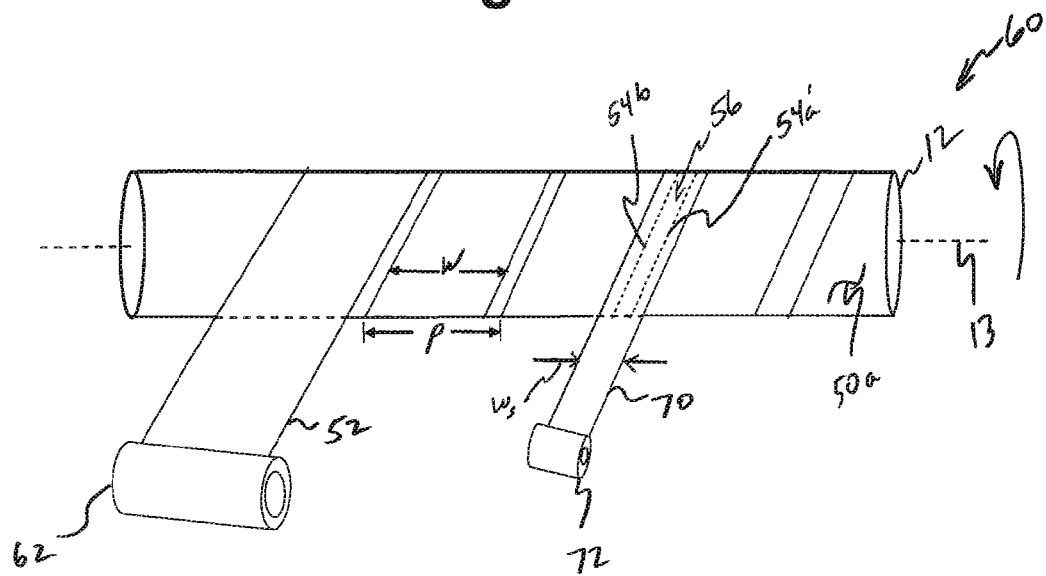
FIG. 2A is a side elevation view of an alternate method of spiral winding the barrier layer of the hose of FIG. 1.

Turning to FIG. 2A, a representative method for winding barrier layer 50a over mandrel 13 is illustrated at 60. In such method, strip 52 is wound over mandrel 13 in the direction indicated by arrow 64 as unraveled from a roll, 62, of a tape or other film of the barrier layer. If desired, the edges 54a-b of each turn may be sealed by an overlaid tape or other sealing strip, 70, which may be similarly spiral wound in the direction of arrow 64 on the barrier layer 50a as dispensed from a roll, 72. As shown, sealing strip 70 may have a width, referenced at "$w_s$," which overlaps each pair of edges 54b and 54a' to thereby seal those edges and cover each of the gaps 56. Sealing strip 70 may be formed of a vulcanizable, low permeation rubber, such as a fluoroelastomer, which may be cured with the other vulcanizable layers in the hose. To improve the adhesion of the strip 52 to those layers, the surfaces of the strip may be etched with a chemical treatment, such as a solution of sodium or other alkali metal in ammonium, an amine, or other solvent, or with a plasma.

Figure 2B:
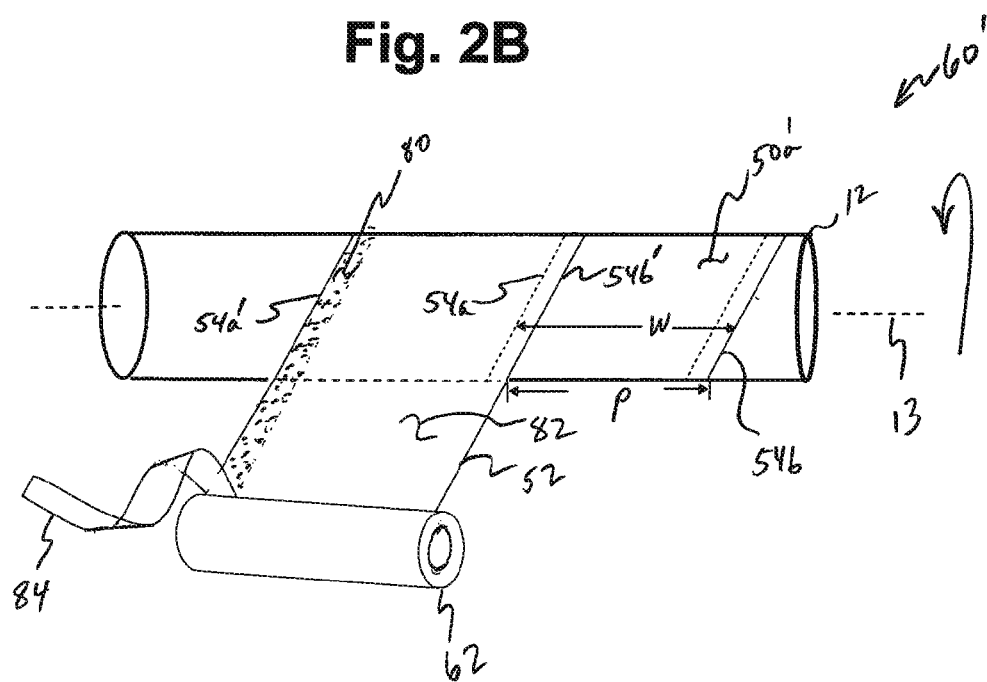
FIG. 2B is a side elevation view of another alternate method of spiral winding the barrier layer of the hose of FIG. 1.

Looking next to FIG. 2B, and alternative method for winding barrier layer 50a, now referenced at 50a', over mandrel 13 is illustrated at 60'. As before method, strip 52 may be wound over mandrel 13 in the direction indicated by arrow 64 as unraveled from roll 62. In such winding, however, the pitch p of the turns is less than the width w of the strip 52 such that each edge 54a, which is shown in phantom, is overlapped by each next adjacent edge 54b'. If again so desired, the so overlapped edges 54a and 54b' may be sealed by an layer, 80, of an acrylic, rubber, or other adhesive which may be of a pressure sensitive, curable, or other variety. Such layer 80 may be coated on or otherwise carried as shown along the edge 54a' of the outside surface, 82, of strip 52. Such layer 80 which alternatively may cover substantially the entirety of surface 82, or which otherwise may be applied in a series of stripes or other pattern, may be covered by a protective peel back strip or sheet, 84, which may be removed as the roll 62 is wound. As the roll 62 is wound, the adhesive exposed on the outside surface 82 of each turn is covered by the facing surface of the next turn to thereby adhere those surfaces together.

Returning now momentarily to FIG. 1, with each of the respective layers 14, 20, 30, 40, and 50 being extruded, wound, or otherwise formed as described, the hose 10 may be steam or otherwise heated to vulcanize the rubber layers and thereby consolidate the construction into an integral hose structure.

Thus, an illustrative rubber hose is described which may be constructed to exhibit low or near zero fluid permeation to petroleum and other chemicals. Such construction may be adapted for use in a variety of fluid transfer applications.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A low fluid permeation hose, the hose extending lengthwise along a longitudinal axis and comprising:
    an inner tube formed of a vulcanized rubber;
    a first barrier layer comprising a first strip of a first polymeric material having a pair of edges defining a widthwise extent of the first strip therebetween, the first strip being spiral wound about the longitudinal axis with each edge of the first strip being spaced-apart from the next adjacent edge; and
    a sealing strip spiral formed of a vulcanized rubber wound about the longitudinal axis on the first strip, the sealing strip having a widthwise extent overlapping each edge of the first strip and the next adjacent edge thereof.

2. The hose of claim 1 wherein the first polymeric material is a thermoplastic.

3. The hose of claim 1 wherein the first polymeric material is a fluoropolymer.

4. The hose of claim 1 wherein the first polymeric material is selected from the group consisting of polytetraflurorethylenes (PTFE), fluorinated ethylene propylenes (FEP), and copolymers, blends, and combinations thereof.

5. The hose of claim 1 wherein the first strip is a film having a thickness of between about 1-10 mil.

6. The hose of claim 1 wherein:
   the first strip has a pair of edges defining a widthwise extent of the first strip therebetween; and
   each edge of the first strip is overlapped by the next adjacent edge.

7. The hose of claim 1 wherein the vulcanized rubber forming the sealing strip is a fluororubber.

8. The hose of claim 1 wherein the barrier layer is the outermost layer of the hose.

9. The hose of claim 1 wherein the barrier layer is the innermost layer of the hose.

10. The hose of claim 1 further comprising a second barrier layer, the second barrier layer comprising a second strip of a second polymeric material spiral wound about the longitudinal axis.

11. The hose of claim 10 wherein the second polymeric material is a fluoropolymer.

* * * * *